United States Patent
Rosenberg

(10) Patent No.: US 9,961,299 B2
(45) Date of Patent: May 1, 2018

(54) VIDEO CONFERENCE AUDIO/VIDEO VERIFICATION

(71) Applicant: Cisco Technology, Inc., San Jose, CA (US)

(72) Inventor: Jonathan Rosenberg, Freehold, NJ (US)

(73) Assignee: Cisco Technology, Inc., San Jose, CA (US)

(*) Notice: Subject to any disclaimer, the term of this patent is extended or adjusted under 35 U.S.C. 154(b) by 0 days. days.

(21) Appl. No.: 15/292,150

(22) Filed: Oct. 13, 2016

(65) Prior Publication Data

US 2017/0070702 A1    Mar. 9, 2017

Related U.S. Application Data

(63) Continuation of application No. 14/809,298, filed on Jul. 27, 2015, now Pat. No. 9,497,412.

(51) Int. Cl.
| | |
|---|---|
| *H04N 7/14* | (2006.01) |
| *G06K 9/00* | (2006.01) |
| *H04L 1/20* | (2006.01) |
| *H04N 7/15* | (2006.01) |

(52) U.S. Cl.
CPC ......... *H04N 7/147* (2013.01); *G06K 9/00228* (2013.01); *H04L 1/20* (2013.01); *H04N 7/15* (2013.01); *H04N 7/152* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,977,605 | A * | 12/1990 | Fardeau | H04N 1/403 358/466 |
| 5,293,430 | A * | 3/1994 | Shiau | H04N 1/40062 358/464 |
| 6,700,979 | B1 * | 3/2004 | Washiya | H04M 9/082 379/388.02 |
| 7,046,134 | B2 | 5/2006 | Hansen | |
| 7,587,028 | B1 | 9/2009 | Broerman et al. | |
| 7,830,814 | B1 | 11/2010 | Allen | |
| 9,674,625 | B2 * | 6/2017 | Armstrong-Muntner | H04R 29/00 |
| 2004/0253991 | A1 | 12/2004 | Azuma | |

(Continued)

OTHER PUBLICATIONS

Toesca, Vincent, Sr., Best Practices for Using Connect Pro VOIP (Mar. 2009) Can be seen at: http://www.connectusers.com/tutorials/2009/03/voip_best_practices/.

*Primary Examiner* — Joseph J Nguyen
(74) *Attorney, Agent, or Firm* — Samuel M. Katz

(57) ABSTRACT

In one embodiment, a method implemented on a video conference participant device includes: receiving video conference data for a video conference session, performing at least the following diagnostic tests: verifying receipt of a presenter image from a presenter video conference device where the presenter video conference device is in use by a participant of the video conference meeting, the participant designated as a presenter for said video conference meeting, verifying receipt of shared desktop content from the presenter video conference device, or verifying receipt of audio data from the presenter video conference device; and transmitting results of said performing to said presenter video conference device.

14 Claims, 6 Drawing Sheets

(56) References Cited

U.S. PATENT DOCUMENTS

| | | | |
|---|---|---|---|
| 2005/0231588 A1* | 10/2005 | Yang | H04L 12/1813 348/14.08 |
| 2006/0020697 A1 | 1/2006 | Kelso et al. | |
| 2006/0271624 A1 | 11/2006 | Lyle | |
| 2008/0133663 A1 | 6/2008 | Lentz | |
| 2010/0220615 A1* | 9/2010 | Enstrom | H04L 29/06027 370/252 |
| 2010/0262266 A1* | 10/2010 | Chang | H04H 20/106 700/94 |
| 2010/0302033 A1* | 12/2010 | Devenyi | H04R 1/1041 340/540 |
| 2011/0154427 A1* | 6/2011 | Wei | H04L 1/0009 725/118 |
| 2012/0026279 A1* | 2/2012 | Kato | H04N 7/15 348/14.08 |
| 2012/0315011 A1* | 12/2012 | Messmer | H04N 21/8358 386/230 |
| 2013/0182063 A1 | 7/2013 | Jaiswal et al. | |
| 2013/0242030 A1* | 9/2013 | Kato | H04L 65/403 348/14.07 |
| 2013/0243213 A1* | 9/2013 | Moquin | H04B 3/20 381/71.1 |
| 2014/0358264 A1* | 12/2014 | Long | G10H 1/0058 700/94 |
| 2015/0113369 A1* | 4/2015 | Chan | G06F 3/1454 715/203 |

\* cited by examiner

VIDEO CONFERENCE AUDIO/VIDEO VERIFICATION

The present application is a continuation of U.S. patent application Ser. No. 14/809,298, filed on Jul. 27, 2015.

FIELD OF THE INVENTION

The present invention generally relates to verification of audio/video data received during a video conference session.

BACKGROUND OF THE INVENTION

Video conferencing is known in art. During a video conference session, one or more participant devices typically receive audio and/or video data provided by one or more other participant devices. The audio data typically represents voice and/or ambient noise picked up by a microphone used by one or more of the other participant devices; the video data typically represents camera images of the other participants and/or images of a shared desktop from a participant device used by a participant designated as a presenter for the video conference session. The audio/video data is then presented on the receiving participant device, thereby enabling its associated user, i.e., a "participant" of the video conference session, to see and hear the other participants of the session.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method implemented on a video conference participant device includes: receiving video conference data for a video conference session, performing at least one of the following diagnostic tests: verifying receipt of a presenter image from a presenter video conference device where the presenter video conference device is in use by a participant of the video conference meeting, the participant designated as a presenter for said video conference meeting, verifying receipt of shared desktop content from the presenter video conference device, or verifying receipt of audio data from the presenter video conference device; and transmitting results of said performing to said presenter video conference device.

A method implemented on a presenter video conference device includes: receiving verification results from at least one video conference participant device, the verification results indicating at least one of: whether a presenter image from the presenter video conference device has been received, whether shared desktop content from the presenter video conference device has been received, or whether audio data from the presenter video conference device has been received; and presenting at least an indication of the verification results on the presenter video conference device.

Detailed Description of Example Embodiments

It's not uncommon that speakers or presenters in a video conference meeting are unsure whether the other participants in the meeting are actually able to hear them, see them, and/or to see the content they are sharing. Accordingly, speakers/presenters often interrupt themselves to inquire: "can everyone hear me?" or "are yon seeing the slides yet?" Sometimes the other participants respond; sometimes they don't. When the other participants do respond, they often do so at the same time, rendering it difficult to determine whether or not all of the participants have indeed responded. And since any participant who indeed does not hear the speaker, will as a consequence also not hear the question, a participant's non-response may be presumed to indicate that the participant does not indeed hear the speaker. Accordingly, it will be appreciated that not only may such inquiries detract from the overall video conference experience, they may also be a rather ineffective way to actually determine whether or not the other participant devices are actually receiving and properly presenting audio data provided by the speaker's participant device.

Figure 1:
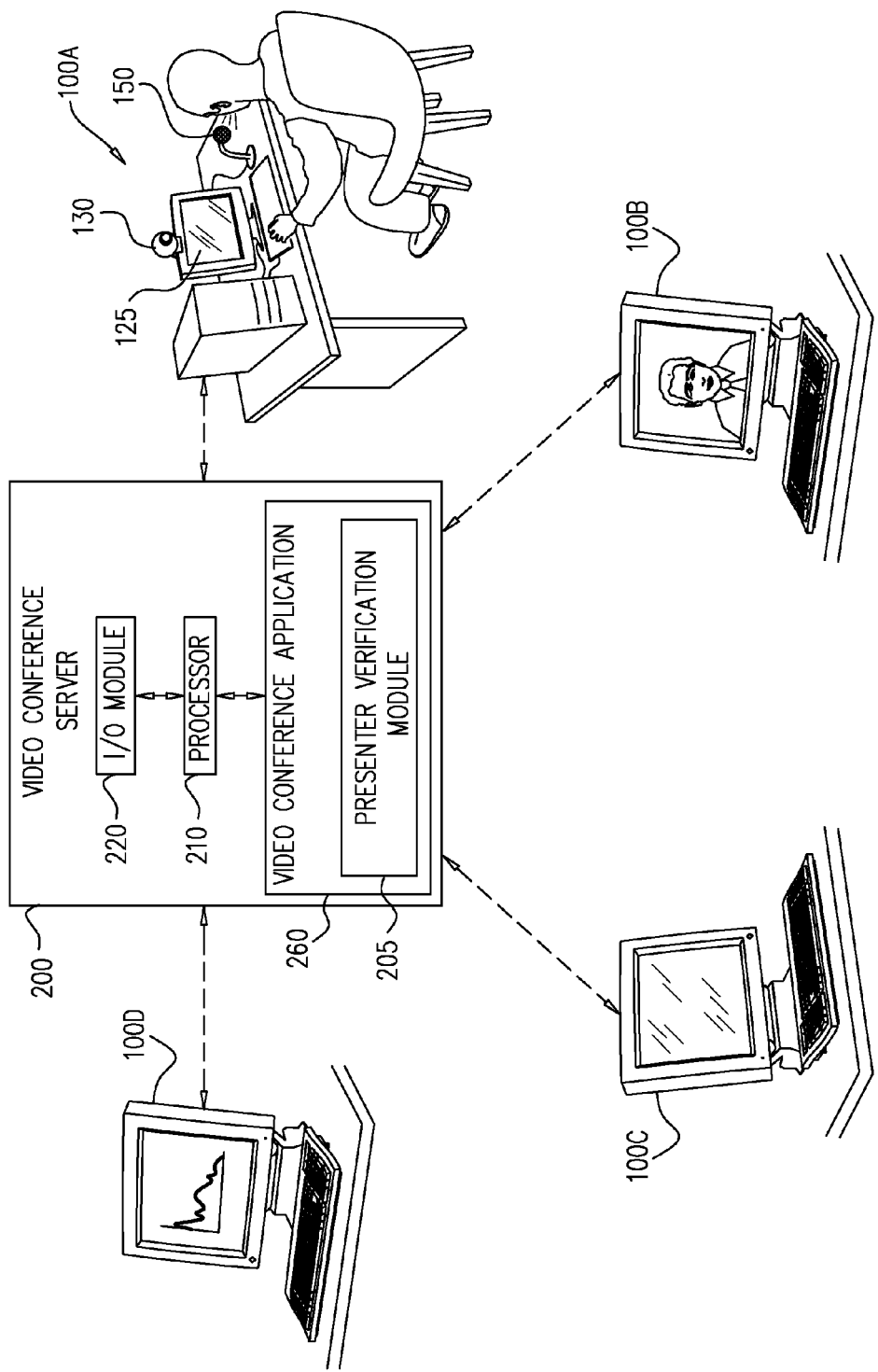
FIG. 1 is a simplified partially pictorial illustration of a multiplicity of participant devices participating in a an exemplary video conference session via a video conference server in accordance with embodiments disclosed herein.

Reference is now made to FIG. 1, which illustrates a multiplicity of video conference participant devices 100 participating in an exemplary video conference meeting via a video conference server 200. In accordance with an exemplary embodiment, the user of video conference participant device 100A has been designated as a presenter for the ongoing meeting depicted in FIG. 1. Audio/video data produced by video conference participant device 100 is forwarded to video conference server 200 via the Internet and/or any other suitable communication network, such as, for example but not limited to, a wide area network (WAN), a local area network (LAN), a mobile communication network, a landline telephone service, etc.

It will be appreciated that for a variety of possible reasons, video conference participant devices 100B, 100C and 100D may not all necessarily receive all of the audio/video data generated by the presenter using video conference participant device 100A. The quality of an IP connection to video conference server 200 may vary, resulting in loss of data. Furthermore, some or all of the data may be transmitted via different media with different levels of quality and/or service. For example, video conference participant device 100B may be configured to receive audio data from video conference server 200 via a voice over IP (VOIP) connection; video conference participant device 100C may be configured to receive audio data through a mobile network; and/or video conference participant device 100D may be configured to receive audio data through "plain old telephone service" (POTS). Each of these delivery mechanisms may provide service of different levels of quality over time, thereby possibly affecting the quality of audio/video signals received by the individual video conference participant devices 100 in a not necessarily uniform manner.

It will similarly be appreciated that irrespective of the audio/video data actually received, the configuration and resources of each video conference participant device 100 may also affect the presentation of the video conference meeting. For example, other applications running in parallel may compete for resources for the video conference meeting. Also, the volume controls may be set such that even if the audio data is received, it may not be played loudly enough for the user to hear.

In accordance with embodiments described herein, video conference participant devices 100 are configured with diagnostic functionality to assess whether or not the audio/video data provided by the presenter is indeed received and accurately presented. In accordance with embodiments described herein the presenter may request that one or more of the video conference participant devices 100 use this functionality to verify that the audio/video presentation has been received and displayed accurately. For example, as depicted in FIG. 1, video conference participant device 100C may not be displaying any video at all; video conference participant device 100B may be displaying the image of the presenter; and video conference participant devices 100D may be displaying a graph shared by the presenter.

Video conference server 200 comprises processor 210; I/O module 220; and video conference application 260. It will be appreciated that video conference server 200 comprises hardware and software components, such as are well-known in the art. It will similarly be appreciated that video conference server 200 may comprise other components that are not depicted in FIG. 1. Video conference server 200 may comprise more than one processor 210. For example, one such processor 210 may be a special purpose processor operative to execute video conference application 260. Video conference application 260 is an application that is implemented in software and/or hardware on video conference server 200. Video conference application 260 may be any suitable server-side application for video conferencing such as, for example, Cisco WebEx or GoToMeeting from Citrix Systems, Inc. In accordance with embodiments described herein, video conference application 260 comprises presenter verification module 205 which may be configured to support the performance of various verification processes performed by video conference participant devices 100.

I/O module 220 is a hardware and/or software component that is configured to transmit and receive data to and from devices in communication with video conference server 200. For example, I/O module may be implemented as a transceiver. Video conference server 200 is configured to use I/O module 220 to facilitate a video conference meeting between users of video conference participant devices 100 as per instructions received from video conference application 260.

As described hereinabove, per the exemplary embodiment of FIG. 1, the user of device 100A has been designator as the presenter and the users of devices 100B, 100C and 100D are listening and/or watching the audio/video presentation provided by device 100A.

As depicted in FIG. 1, video conference participant device 100A comprises display screen 120, camera 130 and microphone 150. It will be appreciated that while video conference participation device 100A is depicted as a collection of peripheral devices attached to a personal computer, other configuration are also supported by the embodiments described herein. For example, video conference participant device 100A may alternatively be implemented as a single integrated hardware device such as, for example, a personal TelePresence unit available commercially from Cisco Systems, Inc. Alternatively, video conference participant device 100A may be implemented as a dedicated video conference suite with one or more installed display screens 120, cameras 130 and/or microphones 150.

It will be appreciated that each of video conference participant devices 100B, 100C and 100D may also be configured and implemented in accordance with any of the configurations described hereinabove with relation to video conference participant device 100A. It will therefore also be appreciated that while for ease of reference, each of video conference participation devices 100 are referred to as single integrated unit, in practice video conference participation units 100 may be comprised of a multiplicity of connected components.

Figure 2:
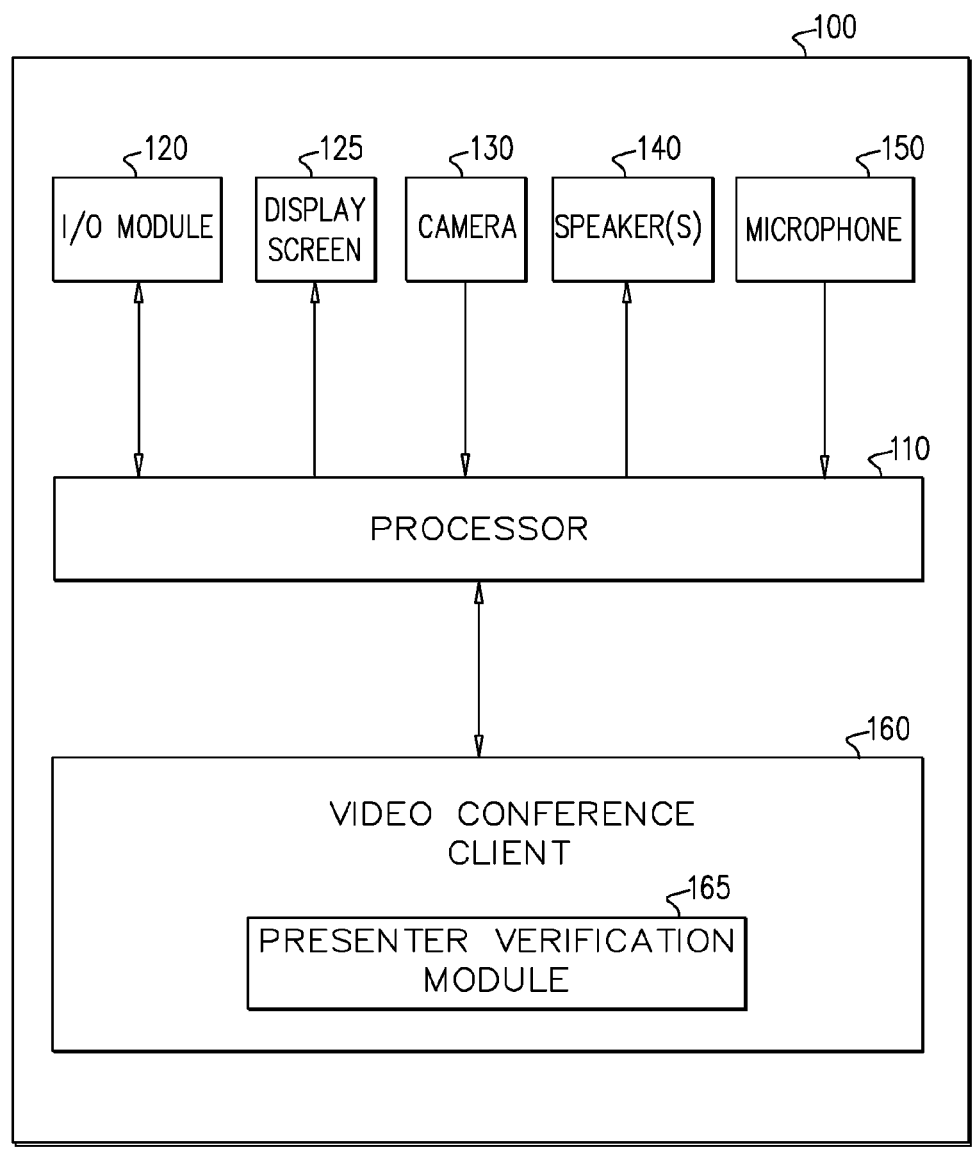
FIG. 2 is a schematic illustration of one of the video conference participant devices of FIG. 1.

Reference is now also made to FIG. 2 which is a block diagram drawing of an exemplary video conference participation device 100, constructed and operative in accordance with embodiments described herein. Video conference participation device 100 comprises processor 110, I/O module 120, display screen 125, camera 130, one or more speakers 140, microphone 150 and video conference client 160. Video conference client 160 is implementable as either a software application and/or hardware component and is executable by processor 110 to facilitate participation by video conference participant device 100 in a video conference meeting such as that depicted in FIG. 1. Processor 110 also operates I/O module 120, display screen 125, camera 130, speaker(s) 140 and microphone 150 in support of video conference meetings as per instructions provided by video conference client 160. For example, I/O module 120 sends and receives audio/video data between the participants of the video conference meeting; received video data is displayed on display screen 125; camera 130 provides video data to be sent to other video conference participant devices 100; speaker(s) 140 play(s) the received audio data; and microphone 150 provides audio input to be sent to other video conference participant devices 100.

In accordance with embodiments described herein, video conference client 160 comprises presenter verification module 165. Presenter verification module 165 is implementable as either a software application and/or hardware component that may be implemented as either an integrated component of video conference client 160 or as an independent module in communication with video conference client 160. As will be described hereinbelow, presenter verification module 165 is configured to perform diagnostic tests on video conference participation device 100 to verify whether or not the audio/video data provided by another participant of a video conference meeting is indeed received and presented accurately.

Figure 3:
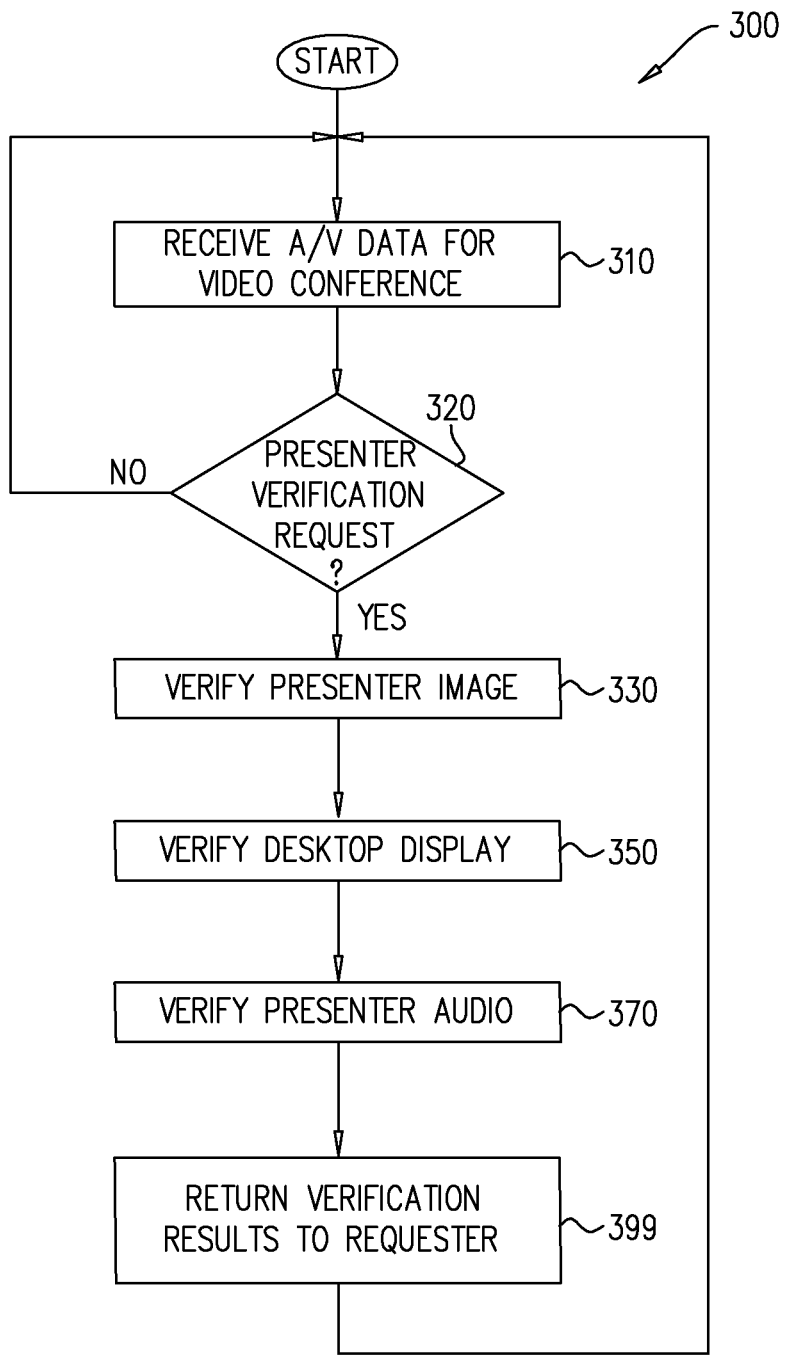
FIGS. 3-6 are flow charts of processes to be performed by the video conference participant device of FIG. 2 in accordance with embodiments disclosed herein.

Reference is now also made to FIG. 3, which is a flow chart illustration of a presenter A/V data verification process 300 to be performed by video conference client 160 during a video conference meeting. Video conference client 160 receives (step 310) a data stream including audio/video data associated with the ongoing video conference meeting. It will be appreciated that such data may be provided as a single data stream from video conference server 200, which may aggregate video and audio data received from multiple video conference participant devices. Alternatively, video conference server may provide the video data and some or all of the audio data may be provided via one or more external communication networks such as mobile or POTS communication networks. The audio/video data is received by I/O module 120 and forwarded for presentation by video conference client 160 using display screen 125 and/or speaker(s) 140.

It will be appreciated that the data stream may also include control data associated with the video conference meeting. For example, the data stream may also include a request submitted by the presenter to verify receipt and accurate presentation of the audio/video data. If a presenter verification request is not received in the data stream (step 320), process control will return to step 310. Alternatively, or in addition, video conference client 160 may be configured to periodically perform steps 330, 350, 370 and/or 399 without a specific request to do from the presenter.

If a presenter verification request is not received in the data stream (step 320), video conference client 160 may invoke presenter validation module 165 to verify (step 330) that the presenter's image has been received and properly displayed on display screen 125.

Presenter verification module 165 may also verify (step 350) that content shared from the presenter's desktop has been received and properly displayed on display screen 125. It will be appreciated that while sharing of desktop content is a popular feature of video conference meetings; it may not always be relevant. If the presenter is not currently sharing and desktop content, the presenter verification request may indicate as much and step 350 may be skipped.

Presenter verification module 165 may also verify (step 370) that audio data produced by the presenter, for example, the presenter's voice, has been properly received and played on speaker(s) 140. It will be appreciated that the audio data may also include an audio track from shared desktop content. It will similarly be appreciated that the presenter may not be the only participant using the same video conference participant device 100. For example, if the presenter's video conference participant device 100 (e.g., video conference participant device 100A as per the exemplary embodiment of FIG. 1) is a video conference room there may be multiple voices represented in the received audio data. It will similarly be appreciated that in any case, there may be other participants speaking at the same time as the presenter, regardless of their location.

Presenter verification module 165 may return (step 399) the results of steps 330, 350 and 370 to the presenter via I/O module 120 and process control may loop back to step 310.

Figure 4:
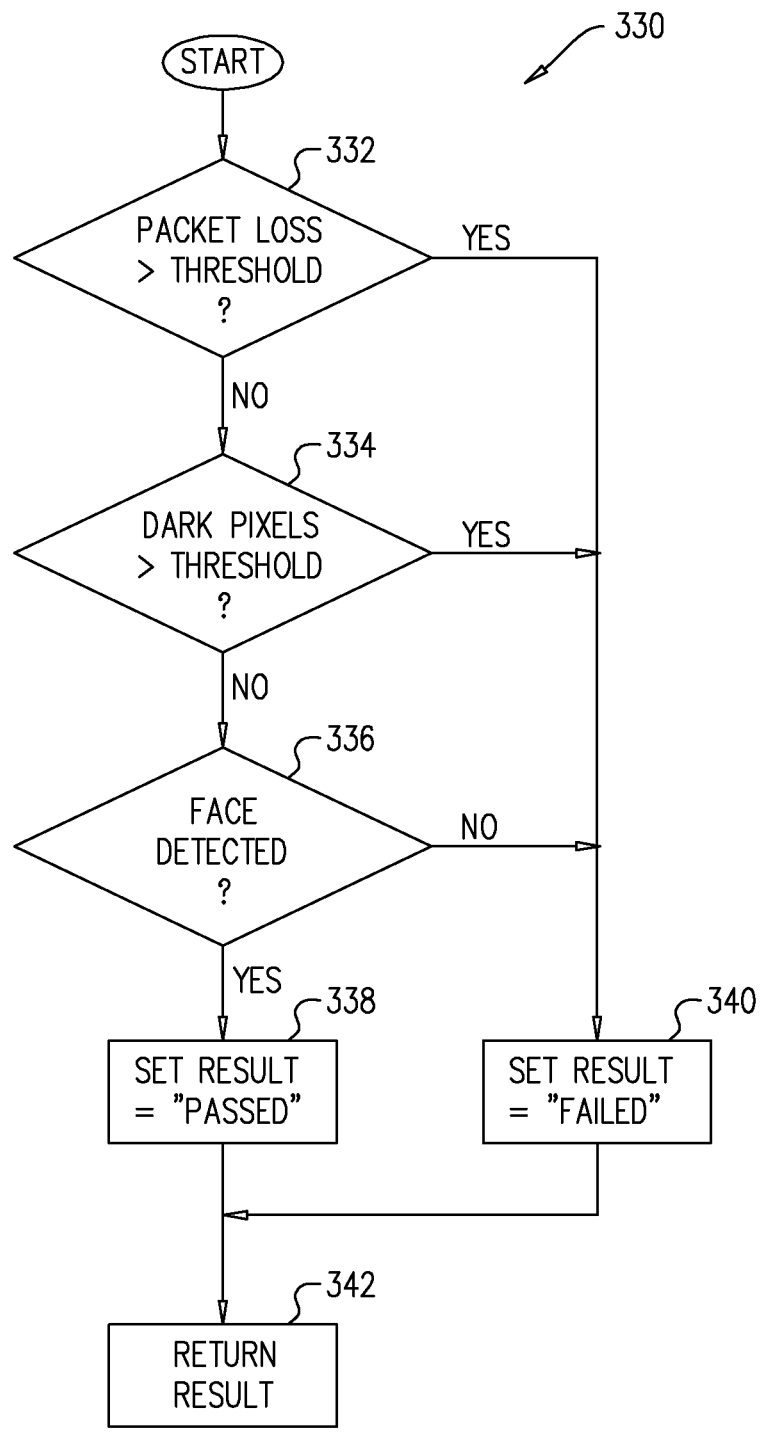

Reference is now made to FIG. 4, which is a flow chart illustration of the details of step 330 in process 300. Presenter verification module 165 may compare observed packet loss of video data versus a defined packet loss threshold. If the packet loss is greater than the defined threshold (step 332), it may be determined that the quality of the video data is unacceptable. Presenter verification module 165 may set (step 340) the result to "FAILED" and return (step 342) the result for inclusion in the results returned to the requester in step 399 (FIG. 3).

It is not uncommon for cameras 130 (FIG. 1) implemented in a personal computer based video conference participation devices 100 to have a lens cover designed to protect camera 130 when not in use. It will be appreciated that it is also not uncommon that a participant in a video conference meeting may forget to remove the lens cover, thereby producing an image consisting largely or entirely of black or at least dark grey pixels when the camera is operative during a video conference meeting. Similar results may be produced by the selection of the wrong camera for use in a video conference. For example, a computer based video conference participation device 100 may also be configured with two cameras, such as a laptop's integrated camera and an external camera for use when the laptop is used with a docking station. In such a case a participant may initially select the integrated camera for use even though the laptop is closed, thereby producing a black image. It will similarly be appreciated that similar results may be produced by a defective camera. Accordingly, presenter verification module 165 may determine whether the percentage of black or grey pixels in the presenter's image is greater than a defined threshold percentage. If the percentage of "dark" pixels is greater than the defined threshold (step 334), it may be assumed that the presenter forgot to remove the lens cover, selected the wrong camera, or that the camera is defective. Presenter verification module 165 may set (step 340) the result to "FAILED" and return (step 342) the result for inclusion in the results returned to the requester in step 399 (FIG. 3).

It is also not uncommon for camera 130 to be positioned such that it does not capture the full image of the presenter. A mounted camera such as used with a personal computer based video conference participant device 100 may have been moved slightly such that it is no longer angled towards the presumed location of the presenter. Alternatively, the presenter may have moved from a coverage area for camera 130. In cases where the presenter's video conference participation device 100 is a dedicated video conference room, there may be multiple cameras 130, and the "wrong" image, i.e., not that of the presenter, may be forwarded to the other participants.

Accordingly, presenter verification module 165 may use an image processing library, for example, OpenCV, originally developed by Intel Research and now supported by Willow Garage and Itseez, to detect whether there the received video actually includes a facial image associated with the presenter. If a face is not detected in the video data (step 336), it may be determined that camera 130 is incorrectly positioned. Presenter verification module 165 may set (step 340) the result to "FAILED" and return (step 342) the result for inclusion in the results returned to the requester in step 399 (FIG. 3).

Alternatively, or in addition face recognition software may be employed to verify that the detected facial image is indeed that of the presenter. If the face in the image is not recognized as that of the presenter verification module 165 may set (step 340) the result to "FAILED" and return (step 342) the result for inclusion in the results returned to the requester in step 399 (FIG. 3).

If step 338 is reached without the result being set to "FAILED" in step 340, presenter verification module 165 may set (step 340) the result to "PASSED" and return (step 342) the result for inclusion in the results returned to the requester in step 399 (FIG. 3).

It will be appreciated that the specific order of execution for steps 332, 334 and 336 may be exemplary. In accordance with embodiments described herein, presenter verification module 165 may perform these steps in any suitable order. Furthermore, in accordance with accordance with embodiments described herein, presenter verification module 165 may be configured to perform only a subset of these steps, e.g., steps 332 and 334, but not 336; steps 334 and 336, but not 332; only 336, but not 332 and 334; etc.

Still further, in accordance with accordance with embodiments described herein, presenter verification module may be configured to perform the verification tests of each of steps 332, 334 and 336 regardless of their outcome; failure of one verification test may not necessarily preclude the performance of subsequent verification tests. In such embodiments, the result returned in step 342 would be an aggregated result including details for each of the individual verification tests.

It will be appreciated that steps 334 and/or 336 may also be performed on the presenter's video conference participant device 100 (e.g. device 100A per the exemplary embodiment of FIG. 1). Similarly, steps 334 and/or 336 may also be performed by presenter verification module 205.

Figure 5:
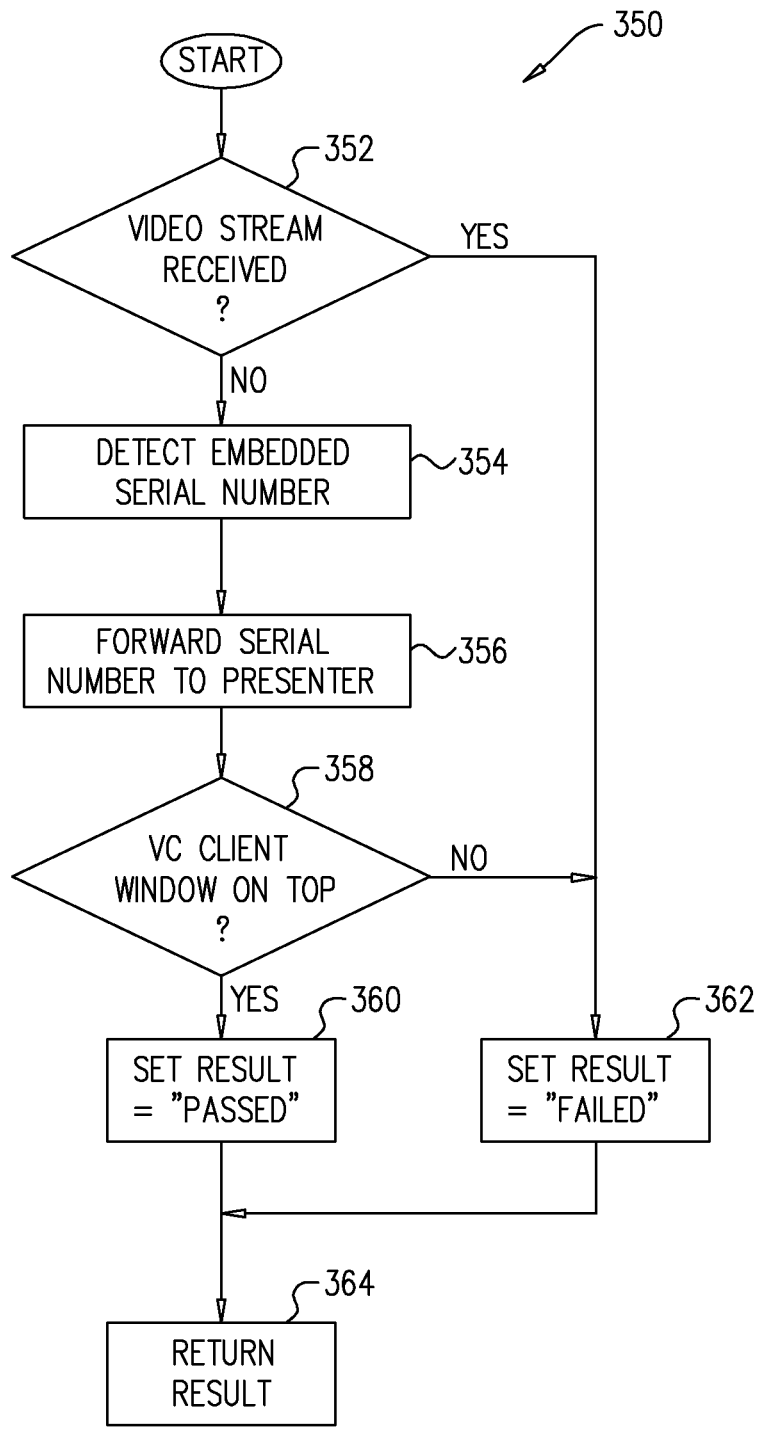

Reference is now made to FIG. 5, which is a flow chart illustration of the details of step 350 in process 300. Presenter verification module 165 may verify that a video stream has been received for the shared desktop content.

Otherwise, presenter verification module 165 may set (step 362) the result to "FAILED" and return (step 364) the result for inclusion in the results returned to the requester in step 399 (FIG. 3). It will be appreciated that in a typical video conference meeting, at any given time, only the current presenter may provide shared desktop content, such that if an associated video stream is received (step 352) it may be assumed to be from the presenter; i.e., there is presumably no need to verify that the video stream is received specifically from the presenter.

Even if presenter verification module 165 confirms that a video stream has been received for the shared desktop content, it is possible that, for whatever reason, the video display of the shared content may be out of sync with the video display on she source device 100. It is therefore not uncommon for a presenter to ask the other participants to confirm that they are seeing the correct slide in a presentation of shared desktop content; there may have been a problem with the continued reception of the video stream sometime after the data was first received by I/O module 120.

In accordance with embodiments described herein, the source device 100 may be configured to embed serial numbers in the outgoing video stream of the shared content. For example, if the shared content is a deck of slides such as may be produced using Microsoft PowerPoint or similar applications, video conference client 160 may be configured to detect a slide change. A slide change may be detected via image comparisons (i.e., a significant change in the video image followed by little or no change), keyboard/mouse input (i.e., detection of an arrow or mouse click to advance a slide), and/or any other suitable method. Video conference client 160 may embed a serial number in the outgoing video stream whenever a slide change is detected. If the shared content is a video clip, video conference client 160 may embed a serial number or relative timestamp (e.g., every five, ten or twenty seconds from the start of the video clip) at intervals in the video clip. Alternatively, or in addition, pre-existing timeline metadata may be used instead of an explicit serial number or timestamp.

Accordingly, presenter verification module 165 may be configured to detect (step 354) a serial number, timestamp and/or metadata embedded in the received video stream and forward (step 356) a copy of the detected serial number, timestamp and/or metadata to the presenter for comparison to a most recent serial number, timestamp and/or metadata associated with a current image displayed at the source device (i.e., the video conference participant device 100 in use by the presenter). Alternatively, or in addition, a copy of the current serial number, timestamp and/or metadata may be included with the verification request received in step 320 (FIG. 3) and presenter verification module 165 may perform the comparison locally, with control proceeding to step 362 if there is no match between the detected and serial number, timestamp and/or metadata.

It is possible that a participant may not be able to see the shared desktop content simply because video conference client 160 has been minimized and/or another application on video conference participant device 100 has been brought to the foreground. It will be appreciated by one of ordinary skill in the art that functionality for the detection of the status of a video conference window is known; for example, the host device of a Cisco WebEx training session may be configured to detect the background/foreground window status for other devices participating in the training session. Accordingly, presenter verification module 165 may be configured to use similar functionality (for example, implemented using operating system APIs) to determine whether or not the window for video conference client 160 is currently displayed "on top", i.e., in the foreground (step 360). If not, presenter verification module 165 may set (step 362) the result to "FAILED" and return (step 364) the result for inclusion in the results returned to the requester in step 399 (FIG. 3).

If step 360 is reached without the result being set to "FAILED" in step 362, presenter verification module 165 may set (step 360) the result to "PASSED" and return (step 364) the result for inclusion in the results returned to the requester in step 399 (FIG. 3).

It will be appreciated that the specific order of execution for steps 352, 354/356 and 358 may be exemplary. In accordance with embodiments described herein, presenter verification module 165 may perform these steps in any suitable order. Furthermore, in accordance with accordance with embodiments described herein, presenter verification module 165 may be configured to perform only a subset of these steps, e.g., steps 352 and 354/356, but not 358; steps 354/356 and 358, but not 352; only 354/356, but not 352 and 358; etc.

Still further, in accordance with accordance with embodiments described herein, presenter verification module 165 may be configured to perform the verification tests of each of steps 352, 354/356 and 358 regardless of their outcome; failure of one verification test may not necessarily preclude the performance of subsequent verification tests. In such embodiments, the result returned in step 364 would be an aggregated result including details for each of the individual verification tests.

Figure 6:
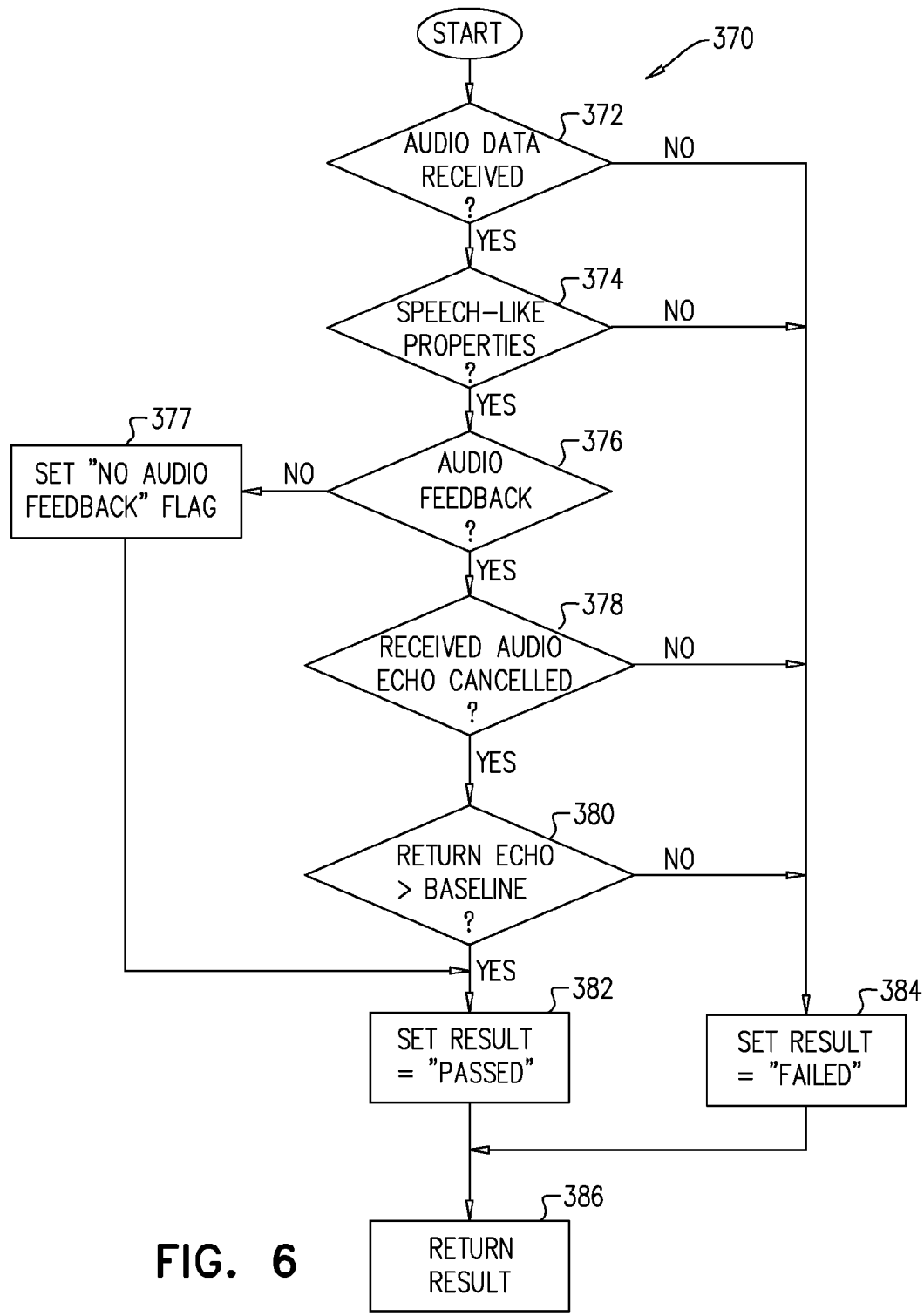

Reference is now made to FIG. 6, which is a flow chart illustration of the details of step 370 in process 300. Presenter verification module 165 may verify that an audio stream has been received for the ongoing video conference. Otherwise, presenter verification module 165 may set (step 384) the result to "FAILED" and return (step 386) the result for inclusion in the results returned to the requester in step 399 (FIG. 3). Presenter verification module 165 may also compare observed packet loss of audio data versus a defined packet loss threshold. If the packet loss is greater than the defined threshold it may be determined that the quality of the video data is unacceptable and the result in may nonetheless be set to "FAILED" in step 384 even though an audio stream was indeed received.

It will be appreciated by one of ordinary skill in the art that in a typical video conference meeting, more than one participant at any given time. Accordingly, presenter verification module 165 may verify that audio signals are being received by video conference participant device 100, without verifying receipt of the presenter's audio per se.

Presenter verification module 165 may also check whether the received audio stream possesses speech-like properties (step 374). For example, presenter verification module 165 my employ any suitable digital signal processing algorithm to detect speech-like properties in the received audio data. Alternatively, or in addition, speech recognition algorithms may be employed to detect and recognize a configurable minimum number of words to indicate that the audio data has speech-like properties. If the received audio data lacks speech-like properties, presenter verification module 165 may set (step 384) the result to "FAILED" and return (step 386) the result for inclusion in the results returned to the requester in step 399 (FIG. 3) if the audio stream does not possess speech-like properties.

It will be appreciated by one of skill in the art that the configuration of the receiving video conference participant device 100 may impact on the ability of presenter verification module 165 to assess whether or not the received audio signals are being provided accurately to the user. Specifically, as discussed hereinbelow, such verification may require audio feedback, i.e., that microphone 150 (FIG. 2) be open and capable of detecting sound from speaker(s) 140 (FIG. 2). If microphone 150 is muted, and/or speaker(s) 140 is/are implemented in a headset unit such that microphone 150 cannot reliably pick up sound from speaker(s) 140, presenter verification module 165 may not be able to perform some verification tests.

Presenter verification module 165 may therefor determine whether or not microphone 150 and speaker(s) are configured to provide audio feedback (step 376). For example, video conference client 160 may be configured to enable a user to use a menu option to mute microphone 150. If microphone 150 is set on mute, there may be no audio feedback. Alternatively, or in addition, the user may indicate to video conference client 160 during a configuration or setup step that microphone 150 and/or speaker(s) 140 are being implemented using a headphone set which may generally prevent audio feedback. Alternatively, or in addition, echo cancellation and/or baseline ambient noise levels may be employed as discussed hereinbelow with regard to steps 378 and 380 may also be used to indicate whether or not video conference participant device 100 as configured provides audio feedback. Similarly, ambient noise in the form of audio signals received by microphone 150 when its associated user is not speaking may be used to determine whether or not the user is using a headset microphone which may presumptively indicate that speaker(s) 140 are also implemented in the same headset, such that audio feedback cannot be provided.

If there is audio feedback via microphone 150 and speaker(s) 140, presenter verification module 165 may use any known echo cancellation method to detect whether or not the audio data received by video conference participant device 100 was echoed via speaker(s) 140 and cancelled out from audio received by microphone 150 (step 178). Presenter verification module 165 may set (step 384) the result to "FAILED" and return (step 386) the result for inclusion in the results returned to the requester in step 399 (FIG. 3) if the audio stream does not possess speech-like properties.

Alternatively, or in addition, presenter verification module 165 may determine whether a return echo as captured by microphone 150 exceeds an ambient baseline level (step 380). Presenter verification module 165 may establish an ambient noise baseline for video conference participant device 100 either as part of a configuration process for video conference client 160 or at the beginning of the video conference. If the audio input from microphone 150 does not exceed the baseline level by a configurable decibel level, presenter verification module 165 may set (step 384) the result to "FAILED" and return (step 386) the result for inclusion in the results returned to the requester in step 399 (FIG. 3).

If audio feedback is not detected (step 376), the presenter verification module 165 may set (step 377) a "no audio feedback" flag and set (step 382) the result to "PASSED" and return (step 386) the result for inclusion in the results returned to the requester in step 399 (FIG. 3); thereby indicating that not all of the verification tests were performed due to the configuration of video conference participant device 100.

It will be appreciated that the specific order of execution for steps 372, 374, 376, 378 and 380 may be exemplary. In accordance with embodiments described herein, presenter verification module 165 may perform these steps in any suitable order. Furthermore, in accordance with accordance with embodiments described herein, presenter verification module 165 may be configured to perform only a subset of the steps, e.g., steps 372-378, but not 380; steps 374-380, but not 372; only 372 and 374, but not 376-380; etc.

Still further, in accordance with accordance with embodiments described herein, presenter verification module 165 may be configured to perform the verification tests of each of steps 372, 374, 376, 378 and/or 380 regardless of their outcome; failure of one verification test may not necessarily preclude the performance of subsequent verification tests. In such embodiments, the result returned in step 386 would be an aggregated result including details for each of the individual verification tests.

Video conference client 160 may be implemented with a user interface (UI) control such as, for example, a button or menu option, that may be used by the presenter to proactively request that process 300 be performed on the other video conference participant devices 100. In accordance with embodiments described herein, the host and/or other designated participants may also use this UI control to proactively request that process 300 be performed on the other video conference participant devices 100.

In accordance with embodiments described herein, video conference client 160 may be configured to provide the results of some or all of the diagnostic tests performed by process 300 in the form of audio and/or displayed messages in order to enable the user of device 100 to attempt to fix problems identified by the tests.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product m on a tangible medium. In some cases, it may be possible to instantiate the software components as a signal interpretable by an appropriate computer, although such an instantiation may be excluded in certain embodiments of the present invention.

It is appreciated that, various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method implemented on a video conference participant device, the method comprising:
   receiving video conference data for a video conference session;
   performing at least the following diagnostic tests:
      verifying receipt of a presenter image from a presenter video conference device wherein said presenter video conference device is in use by a participant of said video conference meeting, said participant designated as a presenter for said video conference meeting,
      verifying receipt of shared desktop content from said presenter video conference device, and verifying receipt of audio data from said presenter video conference device, wherein said verifying receipt of audio data comprises:
  detecting whether said video conference participant device is currently configured to provide audio feedback from said video conference session, wherein said audio feedback is provided by an open microphone receiving audio signals from at least one speaker associated with said video conference participant device,
  upon detecting that said video conference participant device is currently configured to provide said audio feedback, attempting to detect said audio feedback, and
  upon failure to detect said audio feedback, indicating in said results failure of said receipt of audio data; and
transmitting results of said performing to said presenter video conference device.

2. The method according to claim 1 and also comprising:
receiving a request to verify receipt and presentation of audio/video data provided by said presenter video conference device.

3. The method according to claim 1 and wherein said verifying receipt of a participant image comprises:
comparing observed packet loss of video data versus a defined video data packet loss threshold; and
upon determining according to said comparing that said observed packet loss of video data exceeds said defined video data packet loss threshold, indicating in said results failure of said receipt of a presenter image.

4. The method according to claim 1 and wherein said verifying receipt of a participant image comprises:
comparing a percentage of dark pixels in said presenter image to a defined dark pixel threshold percentage, wherein said dark pixels are either black or a shade of grey; and
upon determining according to said comparing that said percentage of dark pixels is greater than said defined dark pixel threshold, indicating in said results failure of said receipt of a presenter image.

5. The method according to claim 1 and wherein said verifying receipt of a participant image comprises:
attempting to detect a facial image in said presenter image; and
upon determining that said attempting is unsuccessful, indicating in said results failure of said receipt of a presenter image.

6. The method according to claim 1 and wherein said verifying receipt of shared desktop content comprises:
upon determining that a video stream for said shared desktop content was not received on video conference participant device, indicating in said results failure of said receipt of a shared desktop content.

7. The method according to claim 1 and wherein said verifying receipt of shared desktop content comprises:
attempting to detect at least one of an embedded serial number, timestamp or timeline metadata in said shared desktop content; and
upon detecting said embedded serial number, timestamp or timeline metadata, transmitting said embedded serial number, timestamp or timeline metadata to said presenter video conference device; and
upon not detecting at least one of said embedded serial number, timestamp or timeline metadata, indicating in said results failure of said receipt of a shared desktop content.

8. The method according to claim 1 and wherein said verifying receipt of shared desktop content comprises:
determining whether a window for said video conference session is displayed as a foreground window on said video conference participant device; and
upon determining that said video conference session is not displayed as said foreground window on said video conference participant device, indicating in said results failure of said receipt of a shared desktop content.

9. The method according to claim 1 and wherein said verifying receipt of audio data comprises:
upon determining that said audio data was not received on said video conference participant device, indicating in said results failure of said receipt of audio data.

10. The method according to claim 1 and wherein said verifying receipt of audio data comprises:
comparing observed packet loss of said audio data versus a defined audio data packet loss threshold; and
upon determining according to said comparing that said observed packet loss of audio data exceeds said defined audio data packet loss threshold, indicating in said results failure of said receipt of audio data.

11. The method according to claim 1 and wherein said verifying receipt of audio data further comprises:
employing digital signal processing algorithms to detect speech-like properties in said audio data; and
upon failure to detect said speech-like properties, indicating in said results failure of said receipt of audio data.

12. The method according to claim 1 wherein said detecting whether said video conference participant device is currently configured comprises:
detecting whether said microphone is muted.

13. The method according to claim 1 wherein said attempting to detect said audio data in said audio feedback further comprises at least one of:
employing echo cancellation algorithms to detect cancellation of said audio data received by said open microphone; or
comparing a baseline ambient noise level to audio signals received by said microphone.

14. A system implemented on a video conference participant device, the system comprising:
means for receiving video conference data for a video conference session;
means for performing at least the following diagnostic tests:
  verifying receipt of a presenter image from a presenter video conference device wherein said presenter video conference device is in use by a participant of said video conference meeting, said participant designated as a presenter for said video conference meeting,
  verifying receipt of shared desktop content from said presenter video conference device, or
  verifying receipt of audio data from said presenter video conference device, wherein said verifying receipt of audio data comprises:
    detecting whether said video conference participant device is currently configured to provide audio feedback from said video conference session, wherein said audio feedback is provided by an open microphone receiving audio signals from at least one speaker associated with said video conference participant device, upon detecting that said video conference participant device is currently configured to provide said audio feedback, attempting to detect said audio feedback, and upon failure to detect said audio feedback, indicating in said results failure of said receipt of audio data; and means for transmitting results of said performing to said presenter video conference device.

\* \* \* \* \*